US012217274B2

(12) United States Patent
Slavin et al.

(10) Patent No.: US 12,217,274 B2
(45) Date of Patent: Feb. 4, 2025

(54) SYSTEM AND METHOD FOR IMPLEMENTING AUTOMATED HARVESTING OF SCANNED CONTRACTS

(71) Applicant: JPMorgan Chase Bank, N.A., New York, NY (US)

(72) Inventors: Ilya Slavin, Allen, TX (US); Wilson De Sousa Ferreira, Jr., New York, NY (US); Fernando Nitz, Buenos Aires (AR)

(73) Assignee: JPMorgan Chase Bank, N.A., New York, NY (US)

( * ) Notice: Subject to any disclaimer, the term of this patent is extended or adjusted under 35 U.S.C. 154(b) by 489 days.

(21) Appl. No.: 17/446,201

(22) Filed: Aug. 27, 2021

(65) Prior Publication Data

US 2023/0064537 A1 Mar. 2, 2023

(51) Int. Cl.
*G06Q 30/02* (2023.01)
*G06F 16/951* (2019.01)
*G06F 16/957* (2019.01)
*G06F 40/20* (2020.01)
*G06Q 30/0201* (2023.01)

(52) U.S. Cl.
CPC ....... *G06Q 30/0201* (2013.01); *G06F 16/951* (2019.01); *G06F 16/9574* (2019.01); *G06F 40/20* (2020.01)

(58) Field of Classification Search
None
See application file for complete search history.

(56) References Cited

U.S. PATENT DOCUMENTS

| | | | | |
|---|---|---|---|---|
| 2007/0279701 A1* | 12/2007 | Hsu | ..................... | G06F 11/3684 |
| | | | | 358/403 |
| 2018/0052647 A1* | 2/2018 | Lee | .......................... | G06F 3/14 |
| 2018/0315141 A1* | 11/2018 | Hunn | ..................... | G06F 9/547 |
| 2020/0004938 A1* | 1/2020 | Brannon | ............... | G06F 21/316 |
| 2020/0117678 A1* | 4/2020 | Woodings | .............. | G06F 16/93 |
| 2020/0250663 A1* | 8/2020 | Abad | .................... | H04L 9/0637 |
| 2021/0081165 A1* | 3/2021 | Deshmukh | ............. | G06N 20/00 |

OTHER PUBLICATIONS

U.S. Appl. No. 16/904,156, Jun. 2020, Salvin et al.
International Searching Authority, International Search Report and Written Opinion, International Application No. PCT/US21/49435, Dec. 8, 2021, pp. 1-10.

* cited by examiner

*Primary Examiner* — Alan Torrico-Lopez
(74) *Attorney, Agent, or Firm* — Greenblum & Bernstein, P.L.C.

(57) ABSTRACT

An embodiment of the present invention is directed to programmatically accessing a contract management system and executing a complex series of interfaces to navigate to the part of the site where it may use previously cached metadata to execute searches for known contracts of interest. Once the workspace for each contract is located, heuristics and/or AI inside the driving code may seek out the scans of signed contracts, and use a managed web browser to download them.

20 Claims, 7 Drawing Sheets

HOME  REPORTS  CATALOG                                    Recent ˅   Manage ˅  Create ˅

| Contract Workspace (Internal) ˅ | CW2xxxx02 | | ˅ | 🔍 | | |

310

| Common Actions ˅ | Event Status ˅ | My Tasks ˅ | Expiring Contracts ˅ | To Do ˅ |
|---|---|---|---|---|
| Create | | | | |
| Sourcing Request | 0 | 0 | 0 | 0 |
| Contract Request (Procurement) | Events | Completed Tasks | Expiring Contracts | Items |
| Analytical Report | | | | |
| Compound Report | | | | |
| Manage | | | | |
| Personal Workspace | | | | |
| Sourcing Library | | | | |
| Supplier Knowledge | | | | |
| More ˅ | | | | |

To Do ˅

| ID | Date ↓ | From | Status | Title | Required Action |
|---|---|---|---|---|---|
| | | | No items | | |

My Documents

| ID | | Title | Date ↓ | Status |
|---|---|---|---|---|
| 📄 WS11xxxxx22 | | Personal Workspace | 11/1/2017 | Draft |
| | | | | View All ˅ |

Recently Viewed ˅

Personal Workspace
Sourcing Library

Figure 3

Search

Project Type: [All ˅]

All

Welcome to the new Search page.

Recently Viewed

Search Filter

View All

CW2xxxx02 (i) ⊕ Options˅

▾My Saved Searches (None)

Reset   Save Search   Search

Search Result

1 project(s) found

| Title ↑ | Owner | Commodity | Status |
|---|---|---|---|
| ☑ 2018, Schedule 5, 60 E. Technologies..... ˅ | asystem3 | Market Data Management So.... | View more |

Open

Search within 2018, Schedule 5, 60 E. Technologies, Inc. ELA 2018

Figure 4

| Search Filter | | | | Options ∨ |
|---|---|---|---|---|
| Search using Title, ID, or any other term | ⊕ | | | |
| | | Reset | Save Search | Search |

Search Result     10 document(s) found

| Title ↑ | Owner | Project | Status | |
|---|---|---|---|---|
| 60 E. Technologies - Schedule 5 – 2018-11-20 FINAL.docx ∨ | M. RYAN | 2018, Schedule 5, 60 E. Technologies.... | ∨ | Published |
| Contract Authorization Template 60 E. ELA FINAL.docx ∨ | M. RYAN | 2018, Schedule 5, 60 E. Technologies.... | ∨ | Published |
| Legal Questionnaire 60 East.xlsx ∨ | Project Owner | 2018, Schedule 5, 60 E. Technologies.... | ∨ | Draft |
| New Abstraction Form ∨ | Contract Data Quality Team | 2018, Schedule 5, 60 E. Technologies.... | ∨ | Published |
| New LOB Recipients ∨ | Project Owner | 2018, Schedule 5, 60 E. Technologies.... | ∨ | Published |
| New Savings Form ∨ | M. RYAN | 2018, Schedule 5, 60 E. Technologies.... | ∨ | Published |
| New Savings Form ∨ | Project Owner | 2018, Schedule 5, 60 E. Technologies.... | ∨ | Not Created |
| Signed_Contract Documents.pdf ∨ | Project Owner | 2018, Schedule 5, 60 E. Technologies.... | ∨ | Draft |
| Sourcing Agreement Contract Attributes ∨ | Project Owner | 2018, Schedule 5, 60 E. Technologies.... | ∨ | Not Created |
| Untitled Contract Terms ∨ | Project Owner | 2018, Schedule 5, 60 E. Technologies.... | ∨ | Active |

View All

Figure 5

| Search Filter | | | Options ⌄ |
|---|---|---|---|
| Search using Title, ID, or any other term ⊖ ⊕ | | Reset | Save Search | Search |
| | | | ▦ |

Search Result — 10 document(s) found

| Title ↑ | Owner | Project | Status |
|---|---|---|---|
| 📄 60 E Technologies - Schedule 5 – 2018-11-20 FINAL.docx ⌄ | M. RYAN | 2018, Schedule 5, 60 E. Technologies.... ⌄ | Published |
| 📄 Contract Authorization Template 60 E. ELA FINAL.docx ⌄ | M. RYAN | 2018, Schedule 5, 60 E. Technologies.... ⌄ | Published |
| 📄 Legal Questionnaire 60 East.xlsx ⌄ | Project Owner | 2018, Schedule 5, 60 E. Technologies.... ⌄ | Draft |
| 📄 New Abstraction Form ⌄ | Contract Data Quality Team | 2018, Schedule 5, 60 E. Technologies.... ⌄ | Published |
| 📄 New LOB Recipients ⌄ | Project Owner | 2018, Schedule 5, 60 E. Technologies.... ⌄ | Published |
| 📄 New Savings Form ⌄ | M. RYAN | 2018, Schedule 5, 60 E. Technologies.... ⌄ | Published |
| 📄 New Savings Form ⌄ | Project Owner | 2018, Schedule 5, 60 E. Technologies.... ⌄ | Not Created |
| 📄 Signed Contract | Project Owner | 2018, Schedule 5, 60 E. Technologies.... ⌄ | Draft |
| Action Download Draft View Details Copy Create Shortcut | Project Owner | 2018, Schedule 5, 60 E. Technologies.... ⌄ | Not Created |
| | | | Active |

View All

Figure 6

| Related Knowledge | 2018, Schedule 5, 60 E. Technologies, Inc, ELA 2018 | | ID CW2xxxx02 |
|---|---|---|---|
| ▷ Expand Projects | Contract Workspace (Procurement) | | Tasks: Incomplete Tasks: 0 |
| All Knowledge Areas | | | |
| Search Knowledge | Overview \| Documents \| Tasks  Team  Message Board  Spend | | |

2018, Schedule 5, 60 E. Technologies,....   Show Details   Actions ▽

| Name | Owner | Status |
|---|---|---|
| ▷ ☐ Contract Approval Documents ∨ | Project Owner | |
| 📄 Untitled Contract Terms ∨ | Project Owner | Active |
| ▷ ☐ Active Amendment Contract Approval Documents ∨ | Project Owner | |
| ▷ ☐ Active Amendment Executed Contract Documents ∨ | Project Owner | |
| ▽ 📁 Supporting Documents ∨ | Project Owner | |
| ▷ ☐ Unused Documents ∨ | Project Owner | |
| ▷ 📁 Executed Contract Documents ∨ | Project Owner | |
| 📄 Signed_Contract Documents ∨ | Project Owner | Signed |
| ▷ ☐ Forms ∨ | Project Owner | |

Figure 7

SYSTEM AND METHOD FOR IMPLEMENTING AUTOMATED HARVESTING OF SCANNED CONTRACTS

FIELD OF THE INVENTION

The invention relates generally to a system and method for automated harvesting of scanned contracts from contract management systems and services.

BACKGROUND OF THE INVENTION

Various entities rely on software as a service providers to provide contract management services. Some complex agreements require a large number of life cycles and an enormous amount of metadata that accumulates from creation through approval to completion. Metadata generally identifies the various terms of the contract (e.g., parties, cost, fees, deliverable, etc.). Software as a service providers may make available contract workspaces where users can upload documents including interim versions, supporting information and ultimately the fully executed contract. Software as a service providers may provide users a daily feed of metadata and agreements in a computer readable format. This information may then be uploaded into a database for analytics and other processing. While the information provided is useful, such service providers do not make corresponding attachments available to users.

While there are procedures in place for automated report and metadata extraction, access to scanned contracts that are "attached" to project records in certain contract management systems have been elusive. In fact, some contract management systems do not permit automated access to scans at all, and attempts to programmatically access this resource have not been successful in the past. Without access to such information, users are not able to perform full text searches across agreements nor are they able to support artificial intelligence (AI) and/or natural language processing (NLP) analysis of contract text.

These and other drawbacks exist.

SUMMARY OF THE INVENTION

According to an embodiment, the invention relates to a system that provides an automated harvesting of scanned contracts. The system comprises: a memory component that stores contract data; an interface that interacts with a contract management system; and an automated harvesting engine that comprises a computer processor and is coupled to the memory component and the interface; the computer processor is further configured to perform the steps of: automatically accessing, through a browser automation tool executing a programmable web browser, the contract management system through a series of interfaces for a contract of interest wherein the browser automation tool emulates a human user interaction with the programmable web browser; accessing cached metadata associated with the contract of interest; based on the cached metadata, executing one or more searches for the contract of interest; locating a workspace within the contract management system for the contract of interest; using heuristics, accessing one or more scans for the contract of interest; using the programmable web browser, initiating a download of the one or more scans; storing the one or more scans in a database; and interacting with a market data analytics tool to perform analytics associated with the one or more scans.

According to another embodiment, the invention relates to a method that provides an automated harvesting of scanned contracts. The method comprises the steps of: automatically accessing, through a browser automation tool executing a programmable web browser, a contract management system through a series of interfaces for a contract of interest wherein the browser automation tool emulates a human user interaction with the programmable web browser; accessing cached metadata associated with the contract of interest; based on the cached metadata, executing one or more searches for the contract of interest; locating a workspace within the contract management system for the contract of interest; using heuristics, accessing one or more scans for the contract of interest; using the programmable web browser, initiating a download of the one or more scans; storing the one or more scans in a database; and interacting with a market data analytics tool to perform analytics associated with the one or more scans.

The invention may be realized through a specially programmed computer system comprising one or more computer processors, interactive interfaces, electronic storage devices, and networks. The computer implemented system, method and medium described herein provide unique advantages to entities, organizations, market data consumers and other users. An embodiment of the present invention is directed to eliminating humans as required tools to retrieve scans of signed legal documents from complex contract management systems to submit into Optical Character Recognition (OCR) workflows. This allows for a more rapid adoption of new contracts of interest that may be analyzed and then searched across. An embodiment of the present invention may be adopted to other systems of record, allowing for contract research and analysis across wide spans of time, areas of interest and/or other metrics and parameters.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 is an exemplary user interface, according to an embodiment of the present invention.

FIG. 4 is an exemplary user interface, according to an embodiment of the present invention.

FIG. 5 is an exemplary user interface, according to an embodiment of the present invention.

FIG. 6 is an exemplary user interface, according to an embodiment of the present invention.

FIG. 7 is an exemplary user interface, according to an embodiment of the present invention.

DETAILED DESCRIPTION OF THE PREFERRED EMBODIMENT(S)

Figure 1:
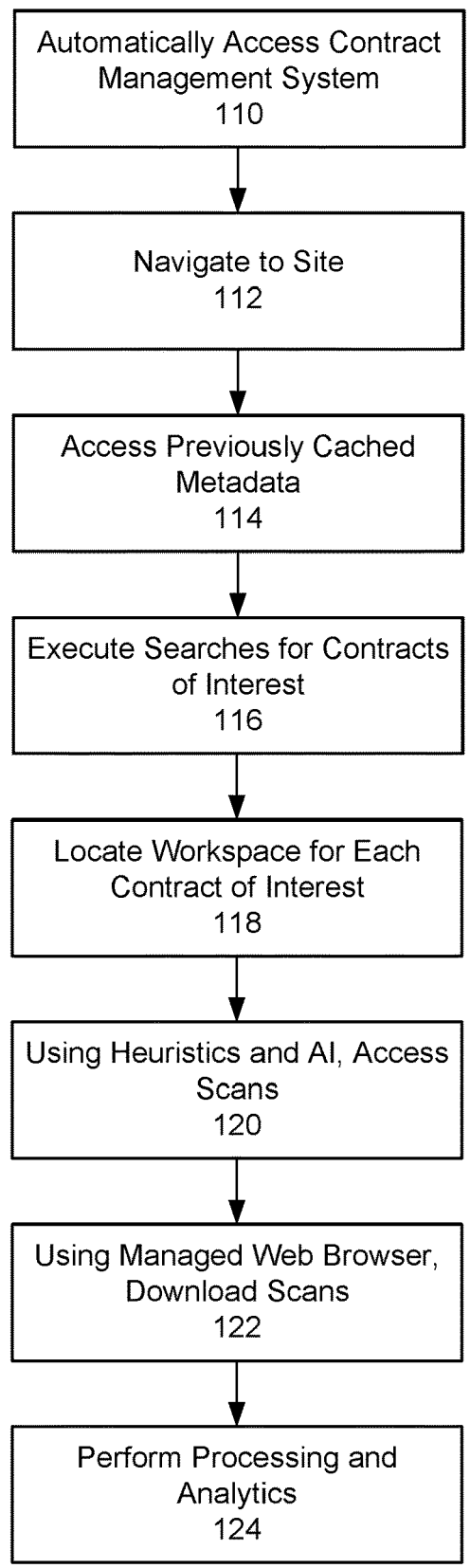
FIG. 1 is an exemplary flow diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Contract management tools are written in a manner that do not support an automated use of standard mechanization tools. This is due to the random nature of HTML tag names and JavaScript-driven user interface (UI) elements that prevent pre-engineered anchoring.

An embodiment of the present invention is directed to programmatically enabling an executable (e.g., robot, software agent, etc.) to login to a contract management system and follow a complex series of interfaces to navigate to the part of the site where it may use previously cached metadata to execute searches for known contracts "of interest." Once the workspace for each contract is located, heuristics and/or artificial intelligence (AI) inside the driving code may seek out the scans of signed contracts, and use a managed web browser to download them. Once files are retrieved, they may be sent to an OCR engine and added to databases. An embodiment of the present invention may integrate with various analytic tools, such as a market data contract analytics tool. Details concerning the market data contract analytics tool are described in co-pending and commonly assigned patent application entitled "System and Method for Implementing a Market Data Contract Analytics Tool," U.S. patent application Ser. No. 16/904,156, filed Jun. 17, 2020, the contents of which are incorporated by reference herein in their entirety.

The market data contract analytics tool enables users to visualize usage rights. For example, the market data contract analytic tools may provide the ability to visualize rights an entity has licensed from various providers or sources. The market data contract analytics tool may further provide searching capabilities (e.g., full text searching, etc.), visualization of agreements the entity has signed or entered into (e.g., linkage, terms, etc.), and analytics on various aspects of the agreements including associated text and metadata. According to an exemplary illustration, the market data contract analytics tools may use a distributed search engine (e.g., Elastic Search) and content extraction technology (e.g., Optical Character Recognition (OCR)) to liberate the data model and enable disparate data sources to be combined to generate advanced analytics, integration with Digital Rights Management (DRM), intelligent search capabilities, etc. The market data contract analytics tool may support contracts involving market data as well as other types of contracts in various lines of business that rely on a large number of contracts and rights management. This may generally involve identifying rights from an agreement, contract, subscription, etc.

FIG. 1 is an exemplary flow diagram, according to an embodiment of the present invention. At step 110, a contract management system may be accessed. At step 112, an embodiment of the present invention may navigate to a site. At step 114, previously cached metadata may be accessed. At step 116, searches for contracts of interest may be executed. At step 118, a workspace for each contract may be located. At step 120, using heuristics and/or AI, scans of signed contracts may be accessed. At step 122, using a managed web browser, the scans may be downloaded. At step 124, processing and analytics may be performed on the downloaded scans. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 110, a contract management system may be accessed. An embodiment of the present invention is directed to implementing an API that allows a user to access a programmable web browser. The API sends commands to the web browser in a manner that resembles a user interaction. An exemplary implementation may involve a UI developer tool that tests code executing in a web browser in a "headless" fashion. For example, an embodiment of the present invention may utilize a browser automation tool that provides extensions to emulate user interaction with browsers. The browser automation tool may include an interface that supports instruction sets that may run interchangeably in various browsers. Browser automation APIs may be used to control browsers and run tests, in a manner consistent with a human user operating the browser. The browser automation tool includes a concise programming interface and supports compact object-oriented APIs.

An embodiment of the present invention integrates a web browser in a programmatic manner. This provides programmatic access to send commands that emulate user interactions (e.g., mouse movements, clicks, etc.) in a virtual web browser. Here, commands may be executed as a human would interact with an interface. This is particular useful when applied against a contract management system that renames objects on a page for every login of each user. In this example, the entire field (or a portion thereof) changes with each instance.

An embodiment of the present invention may operate based on parameters. The parameters may be predetermined and/or defined by a user. For example, a user may identify a whitelist of contract numbers that the user would want to refresh. For a new contract, the user may trigger an initial execution and a workflow may be initiated. The workflow may emulate a human navigating to where the contracts are stored and managed. An embodiment of the present invention may further inject randomness to more accurately reflect a typical human interaction. This may include irregular delays and/or pauses between steps, pages and/or interactions.

An embodiment of the present invention may further obviate and eliminate typographical errors and/or other human errors. For example, an embodiment of the present invention may enumerate the files and identify corresponding data to retrieve and submit the retrieved information to a user for confirmation.

At step 112, an embodiment of the present invention may navigate to a site. This may be achieved by executing a subordinate programmable web browser via a common framework to connect to the site of interest (e.g., contract management system) and allow the calling program to control various functions, such as logon and navigation. With a contract management system, the user interface appears to be consistent from the end-user perspective. However, some contract management systems continuously rename the underlying tags. To a user, the interface appears to be the same but the underlying tags are actually very different at the program-level with each log-in and/or interaction.

Contract management systems are complex and contract-specific which makes navigating through such a system difficult. The system may navigate to a contract workspace which includes a repository of files. This may be represented as a complicated folder structure with multiple layers of folders and subfolders.

An embodiment of the present invention may be preprogrammed to figure out what specific aspects of a database or system that it needs with each interaction. This is required because the interface will look different each time. For example, some contract management sites may create website anchors with different names on every logon. This makes common site automation tools useless or limited. According to an embodiment of the present invention, because a subordinate web browser presents the source code of the webpage to the calling program, it parses the HTML (Hypertext Markup Language)/CSS (Cascading Style Sheets) codebase and determines anchor and link names to trigger that are appropriate to a specific session.

At step 114, previously cached metadata may be accessed. Contract management systems may offer multiple modes including a refresh mode and an on demand upload mode. A refresh mode provides a list of contracts of interest. This may include a list of contract numbers (or identifiers) and allows for access one by one. An on demand upload mode enables a user (such as an analyst) to identify a contract number and trigger an execution for that contract. For example, when an analyst receives a new contract, an on demand upload mode provides an interactive entry point where users may identify a specific contract through a user interface and then initiate an action to retrieve the contract as well as metadata and/or other information. An embodiment of the present invention may access previously cached metadata and then execute searches, at step 116. The searches may pertain to contracts of interest.

At step 118, a workspace for each contract may be located. One or more workspaces within the contract management system for each contract may be identified. This may happen on a one-by-one basis. In addition, searches may be performed on a parallel basis across multiple workspaces.

At step 120, using heuristics and/or AI, scans of signed contracts may be accessed. An embodiment of the present invention may be directed to extracting signed contract images from a system of record, such as a contract management system. Extraction may be for an entire document, select portions, images, etc. For example, Optical Character Recognition (OCR) technology may be applied to convert scans to text. Other recognition and/or extraction technology may include signature detection, proper table extraction, etc. In addition, NLP may analyze text to derive meaning and context.

At step 122, using a managed web browser, the scans may be automatically downloaded. Other data may be collected including negotiation data, analysis of competitive products and services, competitive intelligence, etc.

At step 124, processing may be performed on the downloaded scans. For example, the scans may be sent to an OCR engine and added to a database for analytics, data management, etc. An exemplary workflow may involve uploading character recognition data, extracting out certain text and/or portions, storing the files, texts and/or portions as blocks or other format which enables searching and analytics across various contracts.

Upon establishing access to contracts, an embodiment of the present invention may extract the contracts and/or terms of the contracts and store and manage in a contract management system. In addition, an embodiment of the present invention may interact with a market data contract analytics tool. For example, various analytics and processing may be applied. In addition, the retrieved information may be processed through OCR, NLP and AI/ML models. Currently, this type of processing is unavailable with existing contract management systems.

Figure 2:
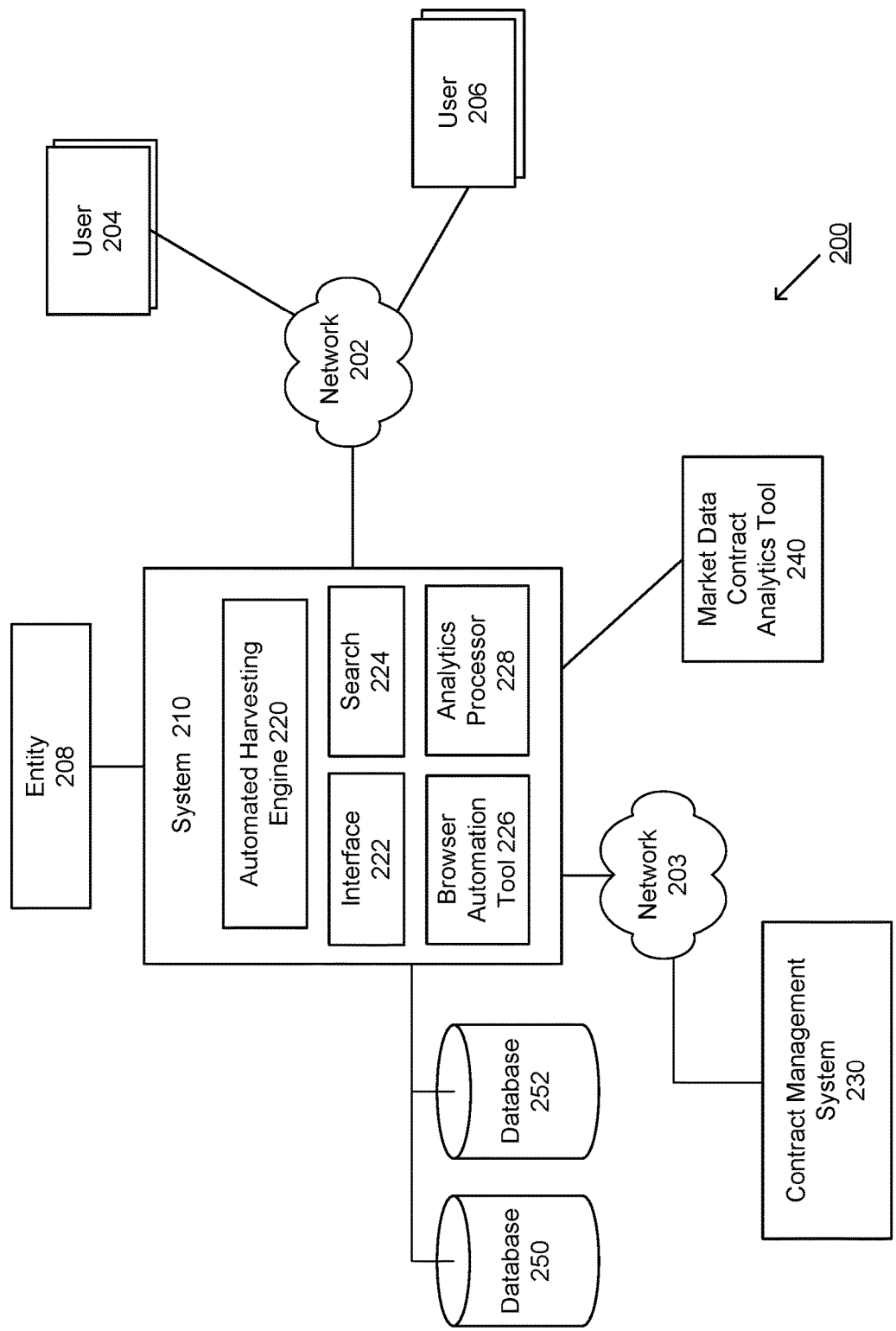
FIG. 2 is an exemplary system diagram, according to an embodiment of the present invention.

FIG. 2 is an exemplary system diagram, according to an embodiment of the present invention. FIG. 2 illustrates System 210 that executes Automated Harvesting Engine 220 and further interacts with Contract Management System 230. System 210 may perform contract negotiations, collection and management services for one or more users, represented by 204, 206. Automated Harvesting Engine 220 may interact with Contract Management System 230 through a Browser Automation Tool 226. Automated Harvesting Engine 220 may support functions and features including Interface 222, Search 224, Browser Automation Tool 226 and Analytics Processor 228. Interface 222 may generate interactive and dynamic visualizations of contracts/agreements, terms, rights, permissions, DRM description, etc. Interface 222 may also provide data in various formats. Search 224 may provide the ability to search across multiple contracts, workspaces, etc. Browser Automation Tool 226 may interact with Contract Management System 230 through Network 203. Analytics Processor 228 may interface with various tools including Market Data Contract Analytics Tool 240.

Entity 208, such as a financial institution, may host System 210. Users may interact via Network 202. Users may include individual users, teams, Lines of Businesses and/or other entities. Users 204, 206 may communicate via Network 202 to access System 210 and Automated Harvesting Engine 220. Automated Harvesting Engine 220 may send and/or receive data from various sources, including Database 250, 252 as well as Contract Management System 230 and other tools, such as Market Data Contract Analytics Tool 240. Databases 250, 252 may store and manage data relating to agreements, contracts, terms, analytics, visualizations, hierarchy data, rights, etc.

The system 200 of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 are depicted, it should be appreciated that other connections and relationships are possible. The system 200 described below may be used to implement the various methods herein, by way of example. Various elements of the system 200 may be referenced in explaining the exemplary methods described herein.

Network 202, 203 may be a wireless network, a wired network or any combination of wireless network and wired network. For example, Network 202, 203 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 202, 203 may support an Internet network, a wireless communication network, a cellular network, Bluetooth, or the like, or any combination thereof. Network 202, 203 may further include one, or any number of the exemplary types of networks mentioned above operating as a stand-alone network or in cooperation with each other. Network 202, 203 may utilize one or more protocols of one or more network elements to which it is communicatively coupled. Network 202, 203 may translate to or from other protocols to one or more protocols of network devices. Although Network 202, 203 is depicted as one network for simplicity, it should be appreciated that according to one or more embodiments, Network 202, 203 may comprise a plurality of interconnected networks, such as, for example, a service provider network, the Internet, a cellular network, corporate networks, or even home networks, or any of the types of networks mentioned above.

Data may be transmitted and received via Network 202, 203 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 2 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals. Interface 222 may represent a user interface and/or other interactive communication portal.

System 210 may be communicatively coupled to Databases 250, 252. Databases 250, 252 may include any suitable data structure to maintain the information and allow access and retrieval of the information. For example, Databases 250, 252 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases 250, 252 may be any suitable storage device or devices. The storage may be local, remote, or a combination thereof with respect to Databases 250, 252. Databases 250, 252 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases 250, 252 may have back-up capability built-in. Communications with Databases 250, 252 may be over a network, or communications may involve a direct connection between Databases 250, 252 and Entity 208, as depicted in FIG. 2. Databases 250, 252 may also represent cloud or other network based storage.

FIG. 3 is an exemplary user interface, according to an embodiment of the present invention. FIG. 3 is an exemplary initial sourcing screen. In the search screen, an identifier is entered in a search bar at 310. In this example, the identifier is a CW number. The system may then search and execute a contract workspace. The results may include a list of contract workspaces that correspond to a particular agreement.

FIG. 4 is an exemplary user interface, according to an embodiment of the present invention. FIG. 4 illustrates a search result screen where an interaction (e.g., right click, etc.) provides an ability to open the file. As shown in FIG. 4, a contract workspace may be selected.

FIG. 5 is an exemplary user interface, according to an embodiment of the present invention. FIG. 5 is an illustration of an actual file storage for a particular agreement. Various files may be displayed in various forms, status, etc.

FIG. 6 is an exemplary user interface, according to an embodiment of the present invention. FIG. 6 illustrates an expanded view of a contract document's options where the contract may now be downloaded. Once the selected contract is downloaded, the system may access additional contracts.

FIG. 7 is an exemplary user interface, according to an embodiment of the present invention.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements an automated harvesting engine, the system comprising:
   a memory component that stores project data;
   an interface that interacts with a project management system that comprises a compilation of scans of documents pertaining to one or more projects; and
   an automated harvesting engine that comprises a computer processor and is coupled to the memory component and the interface, wherein the computer processor is further configured to perform operations comprising:
      logging into, through a browser automation tool executing a programmable web browser, the project management system through a series of interfaces for a project of interest, wherein the browser automation tool emulates human user interactions with the programmable web browser by injecting irregular pauses between steps in order to perform operations including logging into the project management system, and wherein the project management system prevents pre-engineered anchoring;
   parsing a codebase of the project management system to determine appropriate website anchors and link names for each login session, wherein the project management system continuously creates website anchors with different names on every login;
   accessing cached metadata associated with the project of interest;
   based on the cached metadata, executing one or more searches across multiple workspaces for the project of interest;
   locating a workspace within the project management system for the project of interest, wherein the workspace comprises a folder structure with multiple layers of folders and subfolders;
   using heuristics, accessing one or more scans for the project of interest within the project management system;
   using the programmable web browser, initiating a download of the one or more scans from the project management system;
   storing the one or more scans in a database; and
   interacting with a market data analytics tool to perform analytics associated with the one or more scans.

2. The system of claim 1, wherein the project management system operates in multiple modes comprising a refresh mode and an on-demand upload mode.

3. The system of claim 1, wherein the workspace comprises a repository of a plurality of files.

4. The system of claim 1, wherein the one or more scans comprise final executed contracts.

5. The system of claim 1, wherein natural language processing is applied to the one or more scans.

6. The system of claim 1, wherein accessing one or more scans comprises extracting a portion of one or more executed contracts.

7. The system of claim 1, wherein the one or more scans are processed by one or more of: an optical character recognition engine and national language processor.

8. The system of claim 1, wherein the market data analytics tool enables a user to visualize usage rights.

9. A method that implements an automated harvesting engine, the method comprising:
- logging into, through a browser automation tool executing a programmable web browser, a project management system through a series of interfaces for a project of interest, wherein the browser automation tool emulates human user interaction with the programmable web browser by injecting irregular pauses between steps in order to perform operations including logging into the project management system, wherein the project management system comprises a compilation of scans of documents that pertain to one or more projects, and wherein the project management system prevents pre-engineered anchoring;
- parsing a codebase of the project management system to determine appropriate website anchors and link names for each login session, wherein the project management system continuously creates website anchors with different names on every login;
- accessing cached metadata associated with the project of interest;
- based on the cached metadata, executing one or more searches across multiple workspaces for the project of interest;
- locating a workspace within the project management system for the project of interest, wherein the workspace comprises a folder structure with multiple layers of folders and subfolders;
- using heuristics, accessing one or more scans for the project of interest within the project management system;
- using the programmable web browser, initiating a download of the one or more scans from the project management system;
- storing the one or more scans in a database; and
- interacting with a market data analytics tool to perform analytics associated with the one or more scans.

10. The method of claim 9, wherein the project management system operates in multiple modes comprising a refresh mode and an on-demand upload mode.

11. The method of claim 9, wherein the workspace comprises a repository of a plurality of files.

12. The method of claim 9, wherein the one or more scans comprise final executed contracts.

13. The method of claim 9, wherein natural language processing is applied to the one or more scans.

14. The method of claim 9, wherein accessing one or more scans comprises extracting a portion of one or more executed contracts.

15. The method of claim 9, wherein the one or more scans are processed by one or more of: an optical character recognition engine and national language processor.

16. The method of claim 9, wherein the market data analytics tool enables a user to visualize usage rights.

17. The system of claim 1, wherein the one or more scans comprises at least one from among at least one signed contract image and at least one selected portion of the at least one signed contract image, and wherein the cached metadata comprises: parties of a contract of interest, a cost of the contract of interest, contract fees, and a deliverable of the contract of interest.

18. The method of claim 9, wherein the one or more scans comprises at least one from among at least one signed contract image and at least one selected portion of the at least one signed contract image, and wherein the cached metadata comprises: parties of a contract of interest, a cost of the contract of interest, contract fees, and a deliverable of the contract of interest.

19. The system of claim 1, wherein the browser automation tool emulates the human user interactions with the programmable web browser by injecting randomness into interactions that the browser automation tool has with the programmable web browser, and wherein the randomness includes irregular delays that comprise irregular pauses between pages.

20. The method of claim 9, wherein the browser automation tool emulates the human user interactions with the programmable web browser by injecting randomness into interactions that the browser automation tool has with the programmable web browser, and wherein the randomness includes irregular delays that comprise irregular pauses between pages.

* * * * *